United States Patent
Schmidt

(10) Patent No.: US 7,270,523 B2
(45) Date of Patent: Sep. 18, 2007

(54) INJECTION ASSEMBLY FOR AN INJECTION MOLDING MACHINE

(75) Inventor: Holger Schmidt, Bad Frankenhausen (DE)

(73) Assignee: Demag Ergotech GmbH, Schwaig (DE)

( * ) Notice: Subject to any disclaimer, the term of this patent is extended or adjusted under 35 U.S.C. 154(b) by 0 days.

(21) Appl. No.: 11/365,239

(22) Filed: Mar. 1, 2006

(65) Prior Publication Data

US 2006/0153946 A1 Jul. 13, 2006

Related U.S. Application Data

(63) Continuation of application No. PCT/EP2004/008610, filed on Jul. 30, 2004.

(30) Foreign Application Priority Data

Sep. 13, 2003 (DE) ................. 103 42 385

(51) Int. Cl.
*B29C 45/77* (2006.01)
(52) U.S. Cl. ...................................... 425/145
(58) Field of Classification Search ............... 425/145
See application file for complete search history.

(56) References Cited

U.S. PATENT DOCUMENTS

| 4,836,962 A | 6/1989 | Aoki |
| 5,540,495 A | 7/1996 | Pickel |
| 6,309,203 B1 * | 10/2001 | Tamaki et al. ............... 425/145 |

FOREIGN PATENT DOCUMENTS

| DE | 198 31 482 C | 1/2000 |
| DE | 102 20 819 C | 4/2003 |
| DE | 102 22 748 C | 5/2003 |
| EP | 1 219 403 A | 7/2002 |
| JP | 61 266218 A | 11/1986 |
| JP | 04067928 | 3/1992 |
| JP | 05345337 | 12/1993 |

* cited by examiner

*Primary Examiner*—Tim Heitbrink
(74) *Attorney, Agent, or Firm*—Henry M. Feiereisen

(57) ABSTRACT

An injection assembly for an injection molding machine includes a plasticizing screw defining an axis, a housing, and a drive train, which is accommodated in the housing, for moving the plasticizing screw in an axial direction and for turning the plasticizing screw. The drive train includes an injection drive having a screw mechanism with a threaded shaft moveable in direction of an injection stroke, with the plasticizing screw being rigidly connected to the threaded shaft, and a rotary drive having a drive element, with the plasticizing screw being connected to the drive element such that the plasticizing screw is able to turn with the drive element and able to move in axial direction. The drive train is movably supported independently from the rotary drive by a support structure which includes a radial bearing disposed in an area between a screw-proximal end of the threaded shaft and the plasticizing screw, and a linear guide securely fixed to the housing for guiding the drive train during movement in the axial direction.

8 Claims, 1 Drawing Sheet

INJECTION ASSEMBLY FOR AN INJECTION MOLDING MACHINE

CROSS-REFERENCES TO RELATED APPLICATIONS

This application is a continuation of prior filed copending PCT International application no. PCT/EP2004/008610, filed Jul. 30, 2004, which designated the United States and on which priority is claimed under 35 U.S.C. §120, and which claims the priority of German Patent Application, Serial No. 103 42 385.0, filed Sep. 13, 2003, pursuant to 35 U.S.C. 119(a)-(d), the contents of which are incorporated herein by reference.

BACKGROUND OF THE INVENTION

The present invention relates, in general, to an injection assembly for an injection molding machine.

Nothing in the following discussion of the state of the art is to be construed as an admission of prior art.

U.S. Pat. No. 5,540,495 describes an injection assembly having injection and rotary drives which are arranged in coaxial relationship to a plasticizing screw and which are each constructed in the form of a hollow-shaft drive. The injection and rotary drives are securely fixed to a housing and the plasticizing barrel which accommodates the plasticizing screw. During turning as well as movement in injection direction, the plasticizing screw is securely fixed to the threaded shaft of the screw mechanism which implements the injection stroke of the injection drive, and connected in fixed but axially movable engagement with a drive element of the rotary drive. As a result, the screw mechanism is subject to substantial axial as well as radial stress and thus exposed to increased risk of wear, even when constructed as ball screw mechanism.

It would therefore be desirable and advantageous to provide an improved injection assembly to obviate prior art shortcomings.

SUMMARY OF THE INVENTION

According to one aspect of the present invention, an injection assembly for an injection molding machine includes a plasticizing screw defining an axis, a housing, a drive train, accommodated in the housing, for moving the plasticizing screw in an axial direction and for turning the plasticizing screw, wherein the drive train includes an injection drive having a screw mechanism with a force-transmitting member moveable in direction of an injection stroke, with the plasticizing screw being rigidly connected to the force-transmitting member, and a rotary drive having a drive element, with the plasticizing screw being connected to the drive element such that the plasticizing screw is able to turn with the drive element and able to move in axial direction, and a support structure for supporting the drive train for movement in the axial direction independently from the rotary drive, wherein the support structure includes a radial bearing disposed in an area between a screw-proximal end portion of the force-transmitting member and the plasticizing screw, and a linear guide securely fixed to the housing for guiding the drive train during movement in the axial direction.

The present invention resolves prior art problems by constructing the injection assembly in such a way that the screw mechanism is subject to axial stress only from the plasticizing screw and not to radial forces thereof, even though the force-transmitting member, i.e. a threaded shaft of the screw mechanism is rigidly connected to the plasticizing screw. As a result, an unhindered transmission of radial forces from the plasticizing screw to the threaded shaft is prevented so that the screw mechanism is effectively protected against excess stress. In other words, the service life of the screw mechanism is significantly enhanced and downtimes due to repair or maintenance are appreciably reduced. In addition, the screw mechanism runs smoothly.

According to another feature of the present invention, the support structure may be arranged in the area of the screw-proximal end of the force-transmitting member. In this way, the screw mechanism is protected especially effective against radial loads from the plasticizing screw. Suitably, the injection drive is arranged between the plasticizing barrel, which accommodates the plasticizing screw, and the rotary drive, with the linear guide being secured to the housing and to the plasticizing barrel. As a result, the overall construction is simple.

According to another feature of the present invention, the injection and rotary drives may be arranged in coaxial relationship to the plasticizing screw. This is an especially space-saving construction.

According to another feature of the present invention, the injection and rotary drives may each be constructed as an electric hollow-shaft motor. Suitably, at least one of the injection and rotary drives may be speed controllable.

According to another feature of the present invention, the screw mechanism may be constructed as ball screw mechanism.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
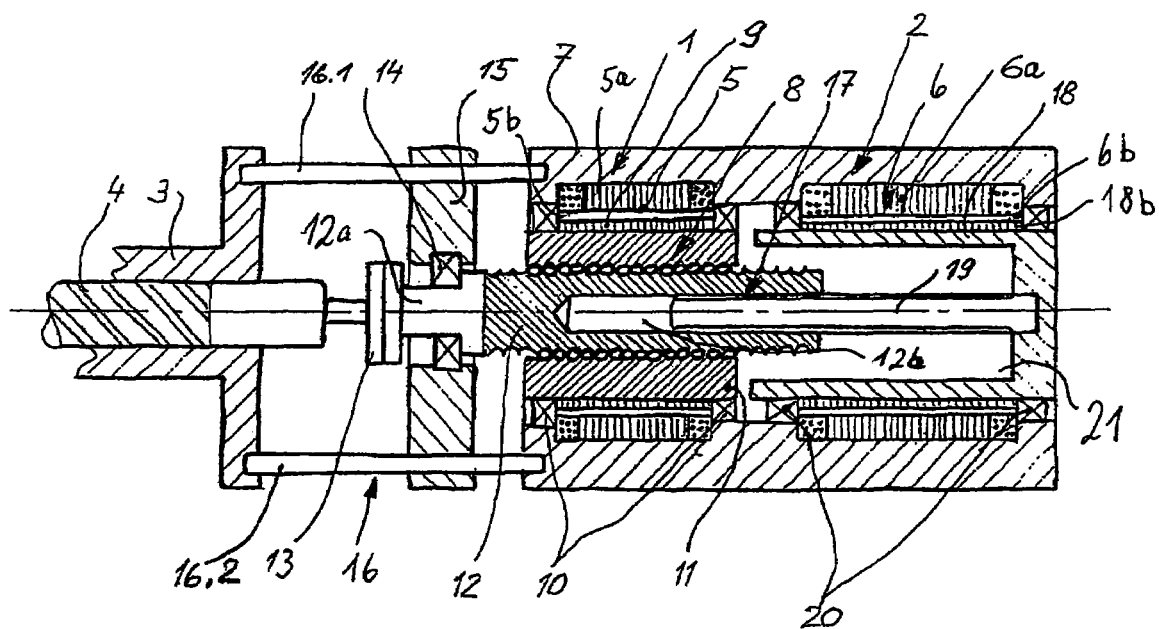
FIG. 1 is a schematic longitudinal section of the drive train of an injection assembly of an injection molding machine according to the present invention.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic longitudinal section of a rear portion of an injection assembly of an injection molding machine, otherwise not shown. The injection assembly includes a plasticizing barrel 3 and a plasticizing screw 4 which is supported in the plasticizing barrel 3 for rotation and axial movement by means of a drive train comprised of an injection drive 1 and a rotary drive 2, respectively. The injection and rotary drives 1, 2 are constructed as electric hollow-shaft motors 5, 6, respectively, which extend coaxially to one another and to the plasticizing screw 4, and are arranged in a common housing 7.

The injection drive 1 includes a stator 5a and a hollow-shaft rotor 9 which are coupled via an air gap 5b. A rotation of the hollow-shaft motor 5 is converted by a screw mechanism, generally designated by reference numeral 8, into an injection stroke movement. Currently preferred is a realization of the screw mechanism 8 in the form of a ball screw mechanism. The screw mechanism 8 includes a screw nut 11, which is supported together with the hollow-shaft rotor 9 by the housing 7 via axial and radial bearings 10, and a force-transmitting member in the form of a threaded shaft 12 which forms the axially movable transmission element and is connected to the plasticizing screw 4 via a shaft coupling 13 in fixed rotative engagement and movably fixed engagement.

The threaded shaft 12 has a screw-proximal end 12a which is rotatably supported through intervention of a radial bearing 14 on a crossbar 15 which is supported by a linear guide, generally designated by reference numeral 16, for movement in an axial direction in relation to the housing 7. The linear guide 16 includes several round guides, of which only round guides 16.1, 16.2 are shown, and which have one end secured to the housing 7 and another end secured to the plasticizing barrel 3.

The rotary drive 2 includes a stator 6a, which is secured to the housing 7, and a hollow-shaft rotor 18 having an electrically excitable magnetic pole assembly 18b which is magnetically coupled to a magnetic pole assembly of the stator 6a via an air gap 6b. A central drive stem 19 as drive element of the rotary drive 2 projects into a cavity 12b of the threaded shaft 12 on its side proximal to the rotary drive 2 and is connected to the threaded shaft 12 via meshing splines 17 such that the threaded shaft 12 is able to turn with the drive stem 19 and is axially movable thereon. The drive stem 19 is secured to the hollow-shaft rotor 18 which surrounds the drive stem 19 leaving an annular space 21. The hollow-shaft rotor 18 is supported by the housing 7 through intervention of axial and radial bearings 20 and forms together with the drive stem 19 the annular space 21 in which the threaded shaft 12 is able to move in.

In operation, the plasticizing screw 4 carries out two main movements. During injection, the plasticizing screw 4 is moved forward and not rotated. During plasticizing, the plasticizing screw 4 is caused to rotate and pushed axially back by plasticized material that has been pressed into the unillustrated end chamber of the plasticizing screw 4. As a result, a definite resistance force (back pressure) is generated.

During the injection and plasticizing phases, the hollow-shaft motors 5, 6 are operated as follows: In the injection phase, the hollow-shaft motor 5 turns the screw nut 11 so that the threaded shaft 12 and thus the plasticizing screw 4 are moved axially forward (to the left in FIG. 1). The hollow-shaft motor 6 does not turn. In the plasticizing phase, the hollow-shaft motor 6 turns the plasticizing screw 4 via the drive stem 19 and the threaded shaft 12 with the required plasticizing torque. At the same time, the hollow-shaft motor 5 turns with a different speed and/or rotation direction as the hollow-shaft motor 6. The speed differential determines the speed of withdrawal of the plasticizing screw 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An injection assembly for an injection molding machine, comprising:
    a plasticizing screw defining an axis;
    a housing;
    a drive train, accommodated in the housing, for moving the plasticizing screw in an axial direction and for turning the plasticizing screw, said drive train including an injection drive having a screw mechanism with a force-transmitting member moveable in a direction of an injection stroke, with the plasticizing screw being rigidly connected to the force-transmitting member in a fixed rotative engagement and a movably fixed engagement, and a rotary drive which is separate from the injection drive and has a drive element, with the plasticizing screw being connected to the drive element such that the plasticizing screw is able to turn with the drive element and able to move in an axial direction; and
    a support structure for supporting the drive train such that the drive train is movable in the axial direction independently from the rotary drive, said support structure including a radial bearing disposed in an area between a screw-proximal end portion of the force-transmitting member and the plasticizing screw, and a linear guide securely fixed to the housing for guiding the drive train during movement in the axial direction.

2. The injection assembly of claim 1, wherein the support structure is arranged in the area of the screw-proximal end of the force-transmitting member.

3. The injection assembly of claim 1, further comprising a plasticizing barrel for accommodating the plasticizing screw, said injection drive being arranged between the plasticizing barrel and the rotary drive, with the linear guide being secured to the housing and to the plasticizing barrel.

4. The injection assembly of claim 1, wherein the injection and rotary drives are arranged in coaxial relationship to one another and to the plasticizing screw.

5. The injection assembly of claim 1, wherein each of the injection and rotary drives is constructed as electric hollow-shaft motor.

6. The injection assembly of claim 1, wherein at least one of the injection and rotary drives is speed controllable.

7. The injection assembly of claim 1, wherein the screw mechanism is constructed as ball screw mechanism.

8. The injection assembly of claim 1, wherein the force-transmitting member is an externally threaded shaft.

\* \* \* \* \*